United States Patent
Alex et al.

(10) Patent No.: US 7,633,694 B2
(45) Date of Patent: Dec. 15, 2009

(54) METHOD AND APPARATUS FOR QUANTIFYING STRESS AND DAMAGE IN MAGNETIC HEADS

(75) Inventors: Michael Alex, Freemont, CA (US); Li Tang, Freemont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 203 days.

(21) Appl. No.: 11/394,454

(22) Filed: Mar. 31, 2006

(65) Prior Publication Data
US 2007/0230000 A1 Oct. 4, 2007

(51) Int. Cl.
*G11B 27/36* (2006.01)
*G11B 5/02* (2006.01)

(52) U.S. Cl. .......................................... 360/31; 360/25
(58) Field of Classification Search ........................ None
See application file for complete search history.

(56) References Cited

U.S. PATENT DOCUMENTS

| 6,249,392 | B1 | 6/2001 | Sacks et al. |
| 6,696,832 | B2 | 2/2004 | Chew et al. |
| 2002/0118473 | A1* | 8/2002 | Yong ............................ 360/31 |
| 2005/0024046 | A1 | 2/2005 | Duan et al. |
| 2005/0073300 | A1 | 4/2005 | Matsukuma et al. |
| 2005/0174703 | A1* | 8/2005 | Gill ........................ 360/324.11 |
| 2005/0190508 | A1* | 9/2005 | Gill .......................... 360/324.1 |
| 2006/0066299 | A1* | 3/2006 | Fox et al. ..................... 324/210 |

* cited by examiner

Primary Examiner—Andrew L Sniezek
(74) Attorney, Agent, or Firm—Merchant & Gould

(57) ABSTRACT

The present invention provides a method and apparatus for quantifying stress and damage in magnetic heads. A change in a performance parameter of a magnetic recording head is characterized. The head is stressed by loading it onto and flying it over a rough zone of the recording medium. A post-stress read-back signal is read from the bit pattern written on the recording medium using the head subsequent to the stressing of the head. A performance parameter of the head is calculated using the post-stress read-back signal. The performance parameter of the head calculated using the post-stress read-back signal is compared to a performance parameter of the head calculated using a pre-stress read-back signal to characterize a change in performance of the head resulting from the stressing of the head.

12 Claims, 16 Drawing Sheets

METHOD AND APPARATUS FOR QUANTIFYING STRESS AND DAMAGE IN MAGNETIC HEADS

BACKGROUND OF THE INVENTION

1. Field of the Invention

This invention relates in general to methods for testing magnetoresistive sensors, and more particularly to a method and apparatus for quantifying stress and damage in magnetic heads.

2. Description of Related Art

Magnetic storage systems, such as magnetic disk storage systems, are commonly used to store digital information. There has been an ongoing effort to reduce the size of such magnetic storage systems while increasing their storage capacity. This has led to components that are smaller yet, which must provide ever-increasing performance. The disk drive includes a mechanical portion in the form of a head-disk assembly and an electronics portion in the form of a printed circuit board assembly that controls functions of the head-disk assembly while providing a communication interface to a host being serviced by the disk drive.

The head-disk assembly has a disk with a recording surface rotated at a constant speed by a spindle motor assembly and an actuator assembly positionably controlled by a closed loop servo system for use in accessing the stored data. The actuator assembly supports a magnetoresistive head with an inductive element, or writer, to write data to and a magnetoresistive (MR) element, or reader, to read data from the recording surface. Such magnetoresistive elements have in the past relied on the anisotropic magnetoresistive (AMR) effect, in so-called AMR sensors, but contemporary magnetoresistive elements rely on a giant magnetoresistive (GMR) effect, in so-called GMR sensors.

The disk drive market continues to place pressure on the industry for disk drives with increased capacities, higher data rates and lower costs. The magnetoresistive head is a high cost component of the disk drive. The trend toward smaller component size and increased component performance has resulted in an increased likelihood that a component could fail. As each head passes through manufacturing processes in preparation for use in a disk drive, costs associated with those processes accrue and contribute to the overall cost of the disk drive. Early detection of potential failure, preferably during manufacture of the storage system, can increase the reliability of those system products that are placed into use.

One type of failure is related to the transducer heads used in such magnetic storage systems. Transducer heads are used to read and write information on a magnetic storage medium. By measuring characteristics of the head throughout the manufacturing process, defective and marginally defective heads can be culled from the process before additional costs are needlessly applied. However, measuring the ability of a magnetic head to withstand inadvertent and often damaging head/disk interactions (HDI's), a term well known in the art of magnetic recording, is an imprecise science. Certain head designs and materials are more or less susceptible to head/disk interaction (HDI) damage, and it is important to know which design is more robust in the drive and less susceptible to damage. Choosing the correct design and material set requires a means to measure and assess the effects of damage caused by head/disk interactions.

One method for assessing damage caused by head/disk interactions involves writing a special bit pattern on a disk using a wide writing head. The polarity of the read-back signal from this pattern is observed as the head to be measured traverses a portion of the medium with asperities and mechanical irregularities, a rough zone. Due to mechanical interactions, so-called head/disk interactions (HDI's), with the asperities on the disk, various performance parameters of the head can degrade amongst these, in particular, asymmetry for which a change in the sign or polarity of the read-back signal might reverse, indicating damage to the read sensor.

For example, a giant magnetoresistive (GMR) read sensor includes a sandwich of layers, also known as a sensor stack, including a ferromagnetic pinned layer (PL), a nonmagnetic electrically conducting layer, and a ferromagnetic free layer (FL). Such GMR sensors include so-called spin valve sensors of the current-in-plane (CIP) and current-perpendicular-to-plane (CPP) variety, tunneling magnetoresistive (TMR) sensors, as well as hybrid type sensors having both TMR and CPP GMR aspects in their construction. The resistance of the magnetoresistive (MR) or giant magnetoresistive (GMR) sensor changes with respect to the direction and magnitude of an applied magnetic field such as the field from a written magnetic transition on a disk. To detect the change in resistance, sense current is passed through the sensor through electrical leads. Typically, hard bias material is disposed in layers near the ends of a sensor stack forming permanent magnets, which impose a stabilizing magnetic biasing field on the sensor stack.

All GMR sensors, and particularly self-biased GMR sensors, are subject to a reversal of the direction of magnetization in the pinned layer. A magnetization reversal occurs when the direction of magnetization in the pinned layer is rotated approximately 180 degrees. A sensor that has experienced magnetization reversal in the pinned layer will exhibit a polarity reversal in the read-back signal. Thus, the read-back signal from a written transition that was originally positive will become negative if a polarity reversal in the pinned layer has occurred. Typically, the recorded information of the servo system is polarity sensitive. In some applications, the synchronization field recorded on the data track is also polarity sensitive. Accordingly, a disk drive having a magnetoresistive sensor that has undergone a magnetization reversal in the pinned layer will no longer function properly. A disk drive user may no longer be able to access the data stored on the disk drive.

While detecting polarity reversal is theoretically sound, the technique is somewhat difficult to reduce to practice because the technique requires a bit pattern to be imparted to the test medium with a wide writing head that may not be readily available and polarity reversal of the read-back signal from the written pattern is not easily detected. Moreover, this technique requires a medium with a previously written bit pattern.

It can be seen then that there is a need for a method and apparatus for quantifying stress and damage in magnetic heads.

SUMMARY OF THE INVENTION

To overcome the limitations in the prior art described above, and to overcome other limitations that will become apparent upon reading and understanding the present specification, the present invention discloses a method and apparatus for quantifying stress and damage in magnetic heads.

The present invention solves the above-described problems by using a head to both read and write a special pattern on a disk. The read-back signal is then used to identify changes in the read sensor due to stress. For example, a difference in asymmetry may be detected if the head experiences damage causing the polarity of the sensor to reverse. Other indicators of changes in the read head due to stress may include a change in the sensor resistance, a change in the signal-to-noise ratio, a change in the bit error rate, a degradation in overwrite, and various head damage indications.

A method for characterizing a change in a performance parameter of magnetic heads in accordance with the principles of the present invention includes stressing the head by loading it onto and flying it over a rough zone of the recording medium wherein the head undergoes a head/disk interaction (HDI) with at least one asperity contained therein, reading a post-stress read-back signal from the bit pattern written on the recording medium using the head subsequent to the stressing of the head, calculating a performance parameter of the head using the post-stress read-back signal and comparing the performance parameter of the head calculated using the post-stress read-back signal to a performance parameter of the head calculated using a pre-stress read-back signal to characterize a change in performance of the head resulting from the stressing of the head.

In another embodiment of the present invention, a method for characterizing a change in a corrected asymmetry is provided. This method includes determining an intrinsic asymmetry of the head by writing a simple symmetric bit pattern to a recording medium using a head being tested, reading a read-back signal of the simple symmetric bit pattern written on the recording medium using the head before stressing the head and calculating a value of the intrinsic asymmetry of the head from the read-back signal of the simple symmetric bit pattern. A first non-intrinsic asymmetry of the head is determined by writing a specially designed bit pattern to a recording medium using a head being tested, reading a first read-back signal from the specially designed bit pattern written on the recording medium using the head before stressing the head and calculating a first value of a non-intrinsic asymmetry of the head from the first read-back signal. A second non-intrinsic asymmetry of the head is determined by stressing the head being tested by loading it onto and flying it over a rough zone of the recording medium wherein the head undergoes a head/disk interaction (HDI) with at least one asperity contained therein, reading a second read-back signal from the specially designed bit pattern written on the recording medium using the head subsequent to the stressing of the head and calculating a second value of a non-intrinsic asymmetry of the head from the second read-back signal. A first corrected asymmetry of the head is determined by calculating a first value of a corrected asymmetry of the head by subtracting a value of the intrinsic asymmetry from a first value of a non-intrinsic asymmetry of the head from the first read-back signal. A second corrected asymmetry of the head is determined by calculating a second value of a corrected asymmetry of the head by subtracting a value of the intrinsic asymmetry from a second value of a non-intrinsic asymmetry of the head from the second read-back signal. The change in the corrected asymmetry due to the stressing from a comparison of the first value of the corrected asymmetry with the second value of the corrected asymmetry is valuated.

In another embodiment of the present invention, a system for quantifying stress and damage in magnetic heads is provided. The system includes a disk for magnetic recording having a smooth zone and a rough zone containing at least one asperity for stressing a head and rotatably connected with a motor, a magnetic head for reading bit patterns from and writing bit patterns to the disk and having an air bearing surface, a suspension to which the head is attached for flying the head over the disk on an air bearing, an actuator for moving the suspension with the head attached thereto from one location to another on the disk in response to signals provided from a controller and a processor, coupled to the head, for stressing the magnetic head by positioning the magnetic head over a rough zone of the recording medium wherein the head undergoes a head/disk interaction (HDI) with at least one asperity contained therein, for reading a post-stress read-back signal from the bit pattern written on the recording medium using the head subsequent to the stressing of the head, for calculating a performance parameter of the head using the post-stress read-back signal and for comparing the performance parameter of the head calculated using the post-stress read-back signal to a performance parameter of the head calculated using a pre-stress read-back signal to characterize a change in performance of the head resulting from the stressing of the head.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 1b illustrates a view of the sensor stack wherein the direction of magnetization in the pinned layer is reversed compared to the magnetization illustrated in FIG. 1a;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for quantifying stress and damage in magnetic heads. A head that is to be tested is used to both read and write a conventional or special bit pattern on a disk. The read-back signal is then used to identify changes in the read sensor due to stress. For example, using a special bit pattern, a difference in asymmetry may be detected if the head experiences damage causing the direction of magnetization of the pinned layer (PL) within the sensor to reverse. Other indicators of changes in the read head due to stress may include a change in the sensor resistance, a change in the signal-to-noise ratio, a change in the bit error rate, detection of a degraded overwrite, degraded PW50 (defined as the read-back pulse width at 50% of the full read-back pulse amplitude), and various head damage indications. In the case of these other indicators, a conventional bit pattern can be used as is known in the art. These deleterious changes in head performance parameters may arise from a variety of causes: pinned-layer reversal, shield shorts to the sensor, mechanical wear, abrasion, or scratching of the sensor, destabilization of the free layer (FL), hard bias destabilization, and more generally damage to any of the layers in the sensor stack, and even damage to the write element of the recording head.

Figure 1A:
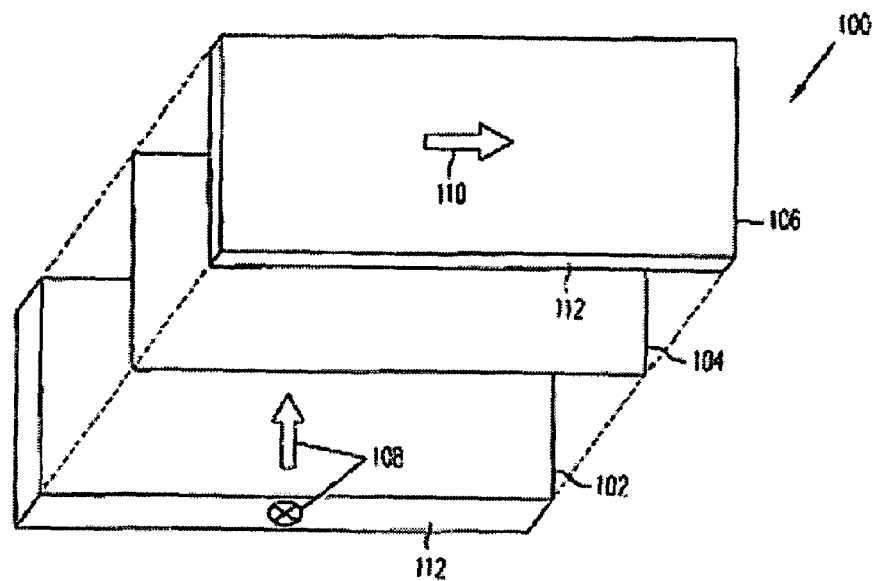
FIG. 1a illustrates a view of a magnetoresistive sensor stack.

FIG. 1a illustrates an exploded view (not necessarily to scale) of a portion of a GMR sensor 100. Typically, a GMR sensor 100 includes a sandwich or stack of layers including a ferromagnetic pinned layer 102, a nonmagnetic conductive layer 104, and a ferromagnetic free layer 106. The direction 108 of magnetization in the pinned layer 102 is ideally held in a fixed direction 108 preventing its rotation. This pinning action may be accomplished by exchange coupling with an adjacent antiferromagnetic layer (not shown). Alternatively, an antiferromagnetic layer may be omitted and the stress-induced magneto-anisotropy of the pinned layer 102 may be relied on for pinning. If no antiferromagnetic layer is present, the sensor is said to be self-pinned. The pinned layer 102 may include an antiparallel-coupled substructure of layers (not shown). In that embodiment, the direction 108 of magnetization in FIG. 1a represents the direction of magnetization in the layer adjacent to the nonmagnetic conductive layer 104. In the absence of an external magnetic field the direction 110 of magnetization in the free layer 106 is approximately orthogonal to the direction 108 of magnetization in the pinned layer 102. However, in the presence of an external magnetic field (not shown), the direction 110 of magnetization in the free layer 106 is free to rotate in response the external field. When the GMR sensor 100 is used in a disk drive for reading magnetically recorded information on a disk (not shown), one edge 112 of the sensor 100 is disposed in proximity to the disk.

Figure 1B:
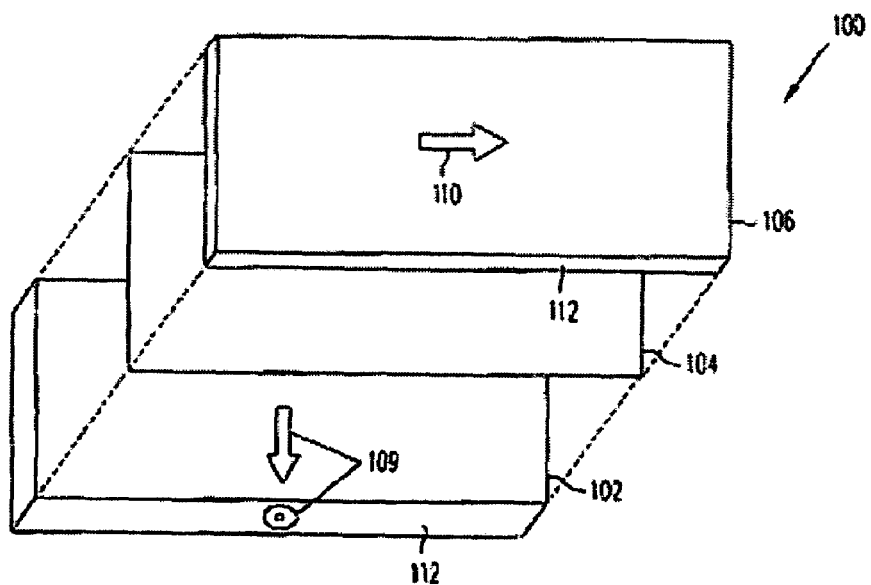

FIG. 1b illustrates an exploded view of a GMR sensor 100 wherein the direction 109 of magnetization in the pinned layer 102 has been reversed compared with the direction 108 of magnetization illustrated in FIG. 1a. The pinned layer 102 typically has a magnetic anisotropy such that the direction of magnetization is typically normal to the disk facing edge 112 and into (108 in FIG. 1a) the sensor 100, or normal to the disk facing edge 112 and out of (109 in FIG. 1b) the sensor 100. A sensor in which the direction of magnetization flips from one direction (108 in FIG. 1a) to the other direction (109 in FIG. 1b) is said to undergo a magnetization reversal in the pinned layer. The read-back signal from the GMR sensor in which a magnetization reversal has occurred exhibits a polarity reversal. All GMR sensors are somewhat susceptible to magnetization reversal in the pinned layer. Self-pinned sensors appear to be somewhat more susceptible to magnetization reversal than GMR sensors using an antiferromagnetic layer. Reversal of the direction of magnetization in the pinned layer causes the observed polarity reversal of the read-back signal.

Figure 2:
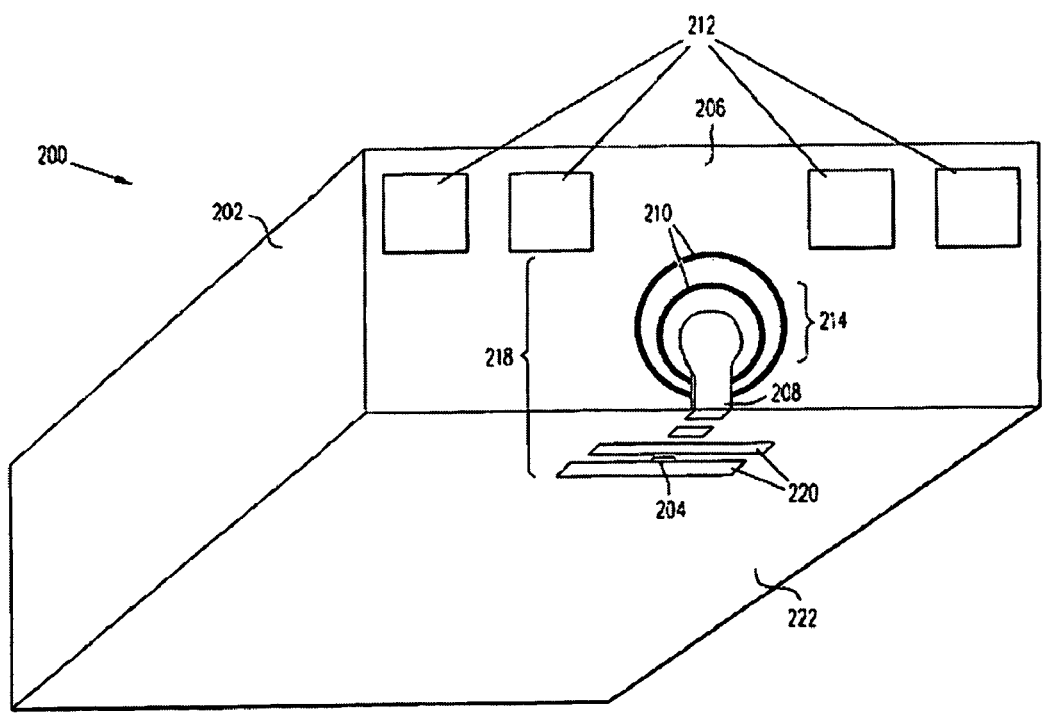
FIG. 2 illustrates a view of a slider with a magnetic head including a magnetoresistive sensor.

FIG. 2 illustrates a slider and a magnetic head assembly 200 configured for use in a storage device such as a disk drive. The magnetic head 218 is constructed on the trailing surface 206 of a slider 202. FIG. 2 illustrates the upper pole 208 and the turns 210 of the coil 214 of a write element of the magnetic head 218. The read element, including a magnetoresistive sensor 204 disposed between two magnetic shields 220, is formed between the slider body 202 and the write element. The electrical connection pads 212 which allow connection with the write element and read element are illustrated. The disk facing portion 222 of the slider 202 typically has an air bearing surface (ABS) (not shown). The disk facing view of the magnetic head 218 is the view on the disk facing portion 222 of the slider 202.

Figure 3:
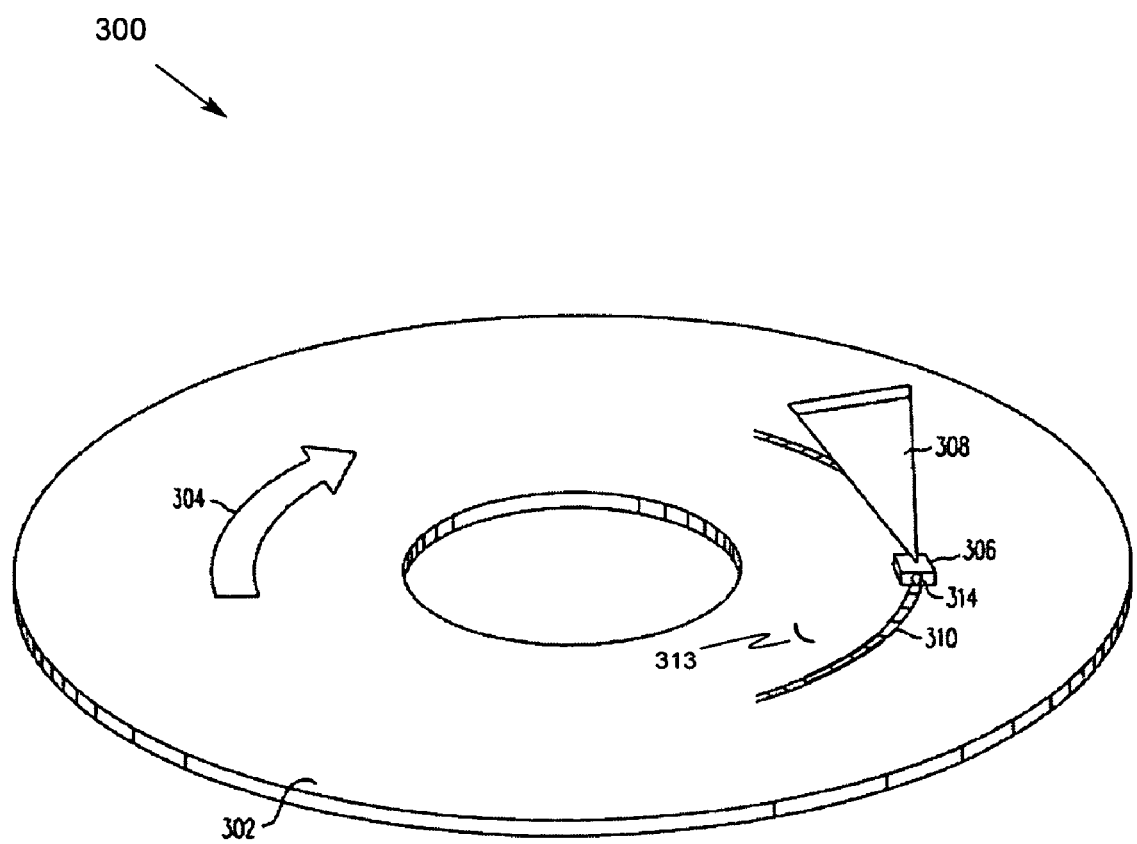
FIG. 3 illustrates a view of an apparatus used for polarity reversal testing according to an embodiment of the present invention.
Figure 11:
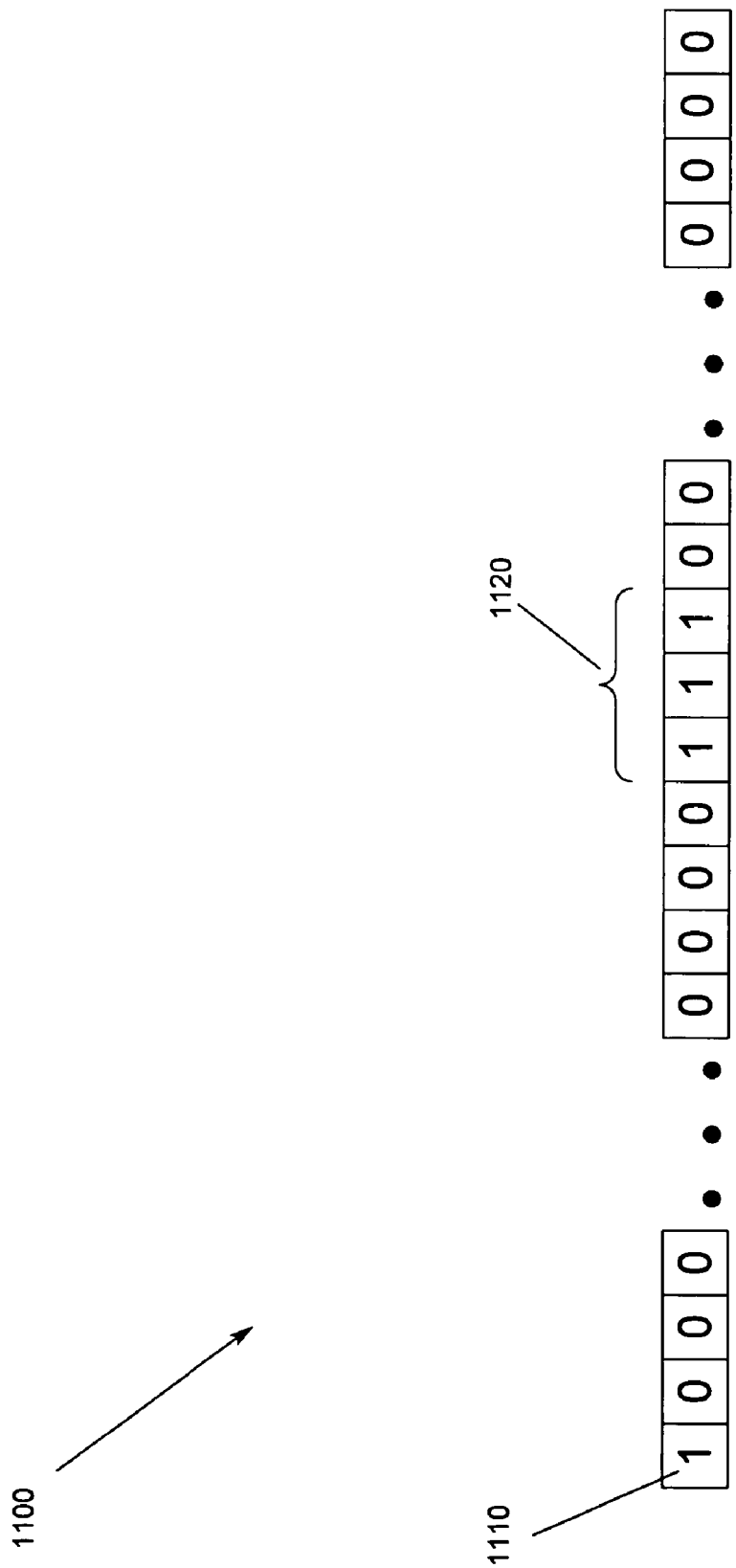
FIG. 11 illustrates a special bit pattern according to an embodiment of the present invention for characterizing changes in the asymmetry performance parameter.

FIG. 3 illustrates an apparatus 300 for testing magnetoresistive sensors, generally, and, in particular, for polarity reversals of a GMR sensor. A disk 302 used for magnetic recording is rotatably connected with a motor (not shown). The magnetic disk 302 rotates 304 while the magnetoresistive sensor is being tested. A slider 306, attached to a suspension 308, is disposed over the magnetic disk 302. A magnetic head 314 is disposed on the slider 306. A portion of a data track 310 is illustrated. The data track 310 is written with a pattern suitable for evaluating the magnetoresistive sensor (e.g., as shown in FIG. 11) according to an embodiment of the present invention. As will be described below, a rough zone 313 may be provided. The rough zone 313 includes asperities that are located at specific radial and circumferential coordinates on the surface of the disk that have been mapped out prior to testing of a head on the disk. The location of these asperities differs from that where a bit pattern suitable for evaluating the magnetoresistive sensor or giant magnetoresistive sensor is written during testing of a head.

Figure 4:
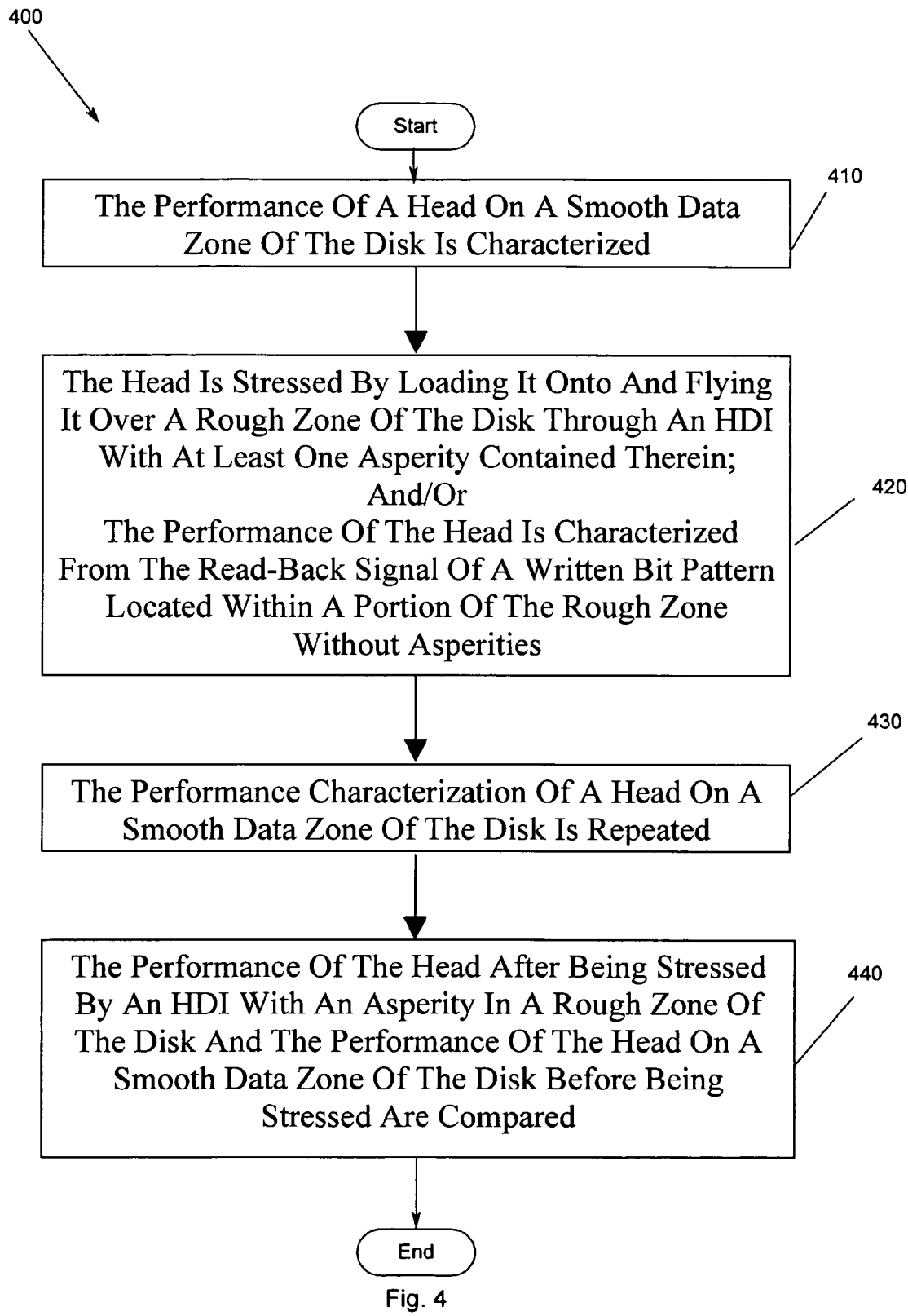
FIG. 4 illustrates a method for quantifying stress and damage in read heads according to an embodiment of the present invention.

FIG. 4 illustrates a flow chart 400 of a method for characterizing a change in a performance parameter of a head, and, in particular, for quantifying stress and damage in GMR read heads according to an embodiment of the present invention. The performance of a head on a smooth data zone of the disk is characterized 410. The head is stressed by loading it onto and flying it over a rough zone of the disk through an HDI with at least one asperity contained therein. The performance of the head may be characterized using the read-back signal of a written bit pattern located within a portion of the rough zone without asperities 420. The rough zone could comprise any of the following: a single asperity, or a group of asperities, at previously determined radially and circumferentially specified locations on the disk surface. Thus, a rough zone could be confined to a unique radial and circumferential location of an asperity or locations of asperities on the disk, or more generally to regions of the disk containing such asperities, yet also having portions substantially without asperities, i.e., specific circumferential data tracks, data zones, or data sectors of the disk. Note it is not necessary to characterize the performance of the head in the rough zone; but it is possible to do so if a bit pattern can be written to portions of the rough zone without asperities. If the performance of the head is characterized by writing to and reading from the rough zone, the head can be gated "on" to read the bit pattern from those portions of the rough zone without asperities where it had been previously written. To gate "on" the head at an asperity-free location requires that the location of an asperity be mapped with respect to its radial and circumferential coordinates. These coordinates are made available to control circuits directing the motion of the head, the disk, and the voltage source gating "on" the head when it is located at a bit pattern in an asperity-free portion of the rough zone. The performance characterization of a head on a smooth data zone of the disk is repeated 430. The performance of the head after being stressed by an HDI with an asperity in a rough zone of the disk and the performance of the head on a smooth data zone of the disk before being stressed are compared 440.

Figure 5:
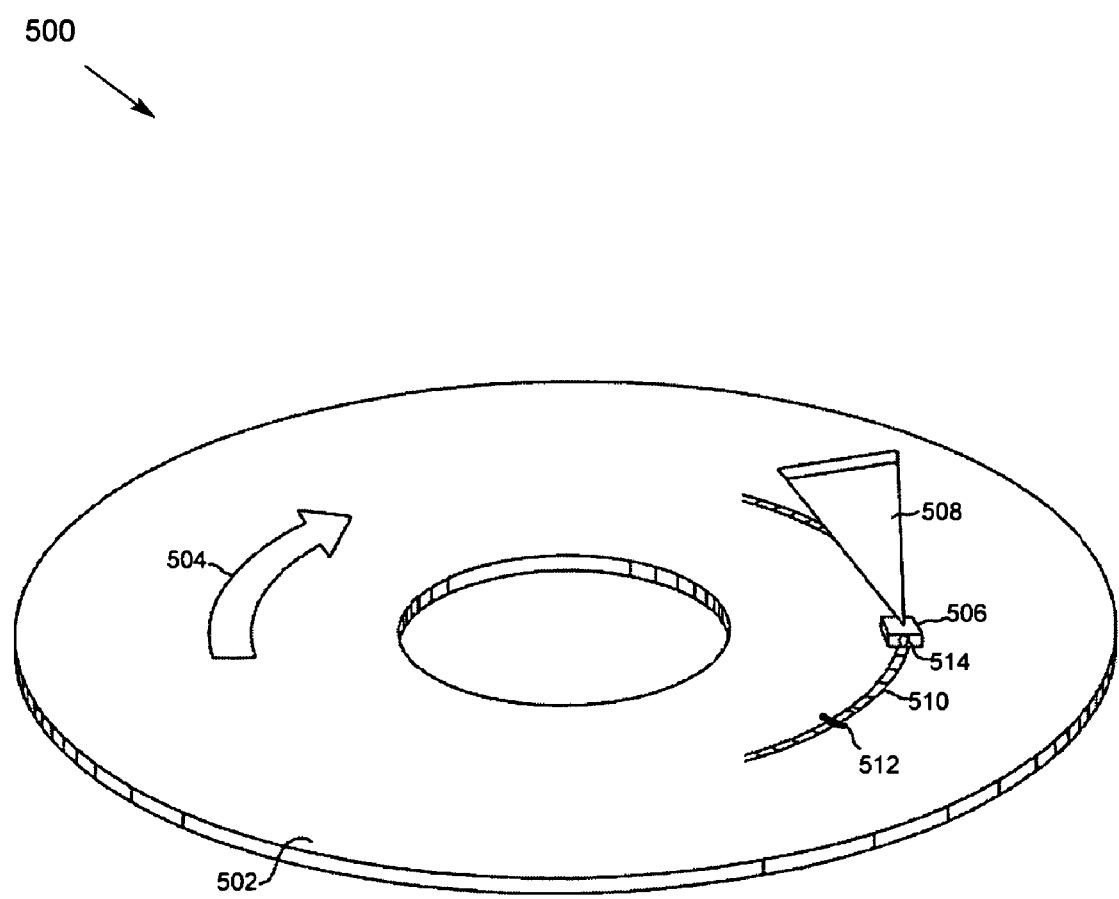
FIG. 5 shows a second embodiment of the present invention, wherein asperities are located at specific angular positions around a given track instead of having data and asperities at different radii on the disk.

Those skilled in the art will recognize that the present invention is not meant to be limited to the use of a zone of asperities at a different radius for stressing the head and then taking recording measurements before and after stress. For example, FIG. 5 shows a second embodiment 500 of the present invention, wherein asperities 512 are located at specific angular positions around a given track instead of having data and asperities at different radii on the disk. The disk is rotated in the direction 504 by a motor to which it is connected rotatably connected through a spindle, so that it spins when given a signal from the disk controller, not shown. Upon spinning, the slider 506 with the head 514 disposed thereon is loaded onto the disk 502 by the motion of an actuator to which the slider 506 is attached through a suspension 508 attached thereto. The actuator motion in loading the slider 506 onto the disk 502 is also controlled through a signal received from the disk controller. In the case of a rough zone of the disk, at least one asperity is located along the recording track 510. Then, recording measurements could be made based on the read-back signal from asperity-free track regions between the asperities. By electronically "gating out" the head read-back signal when the head is near the asperities, distortions of the read-back signal can be avoided.

Figure 6:
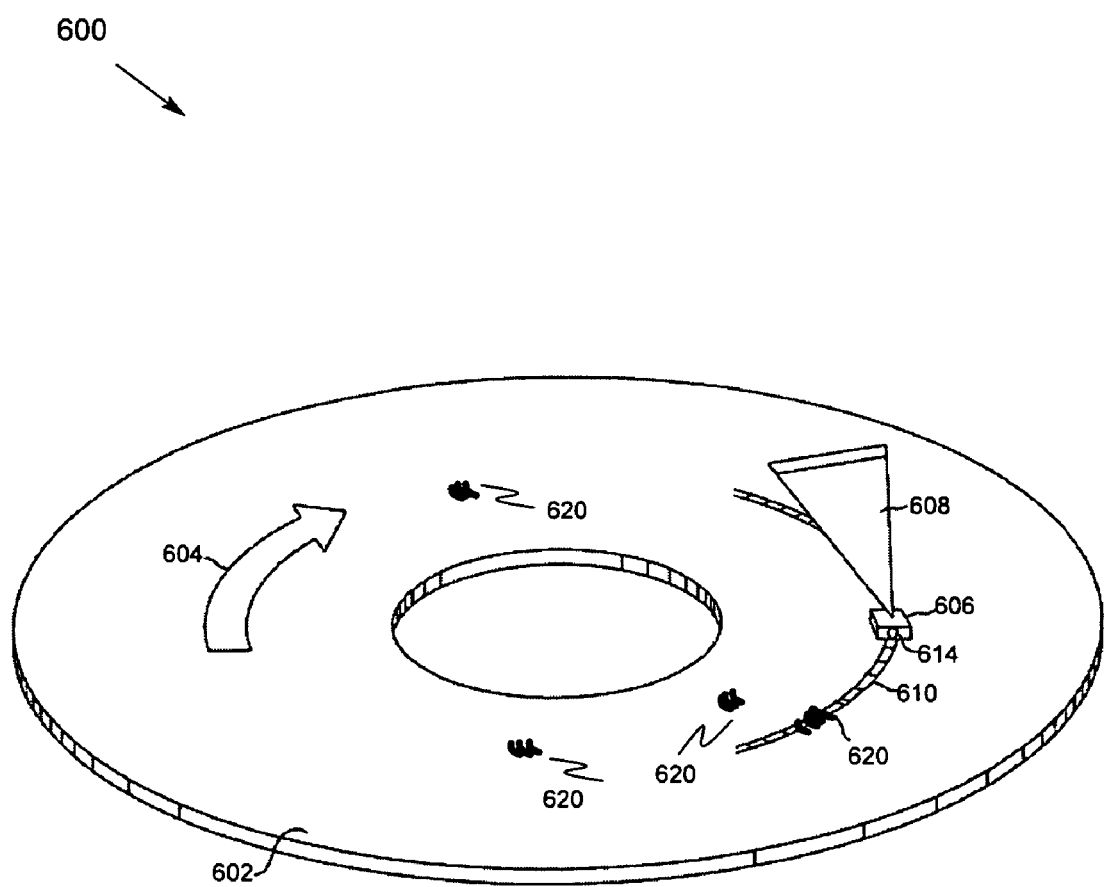
FIG. 6 shows another embodiment of the present invention wherein asperities are found at well-defined locations.

FIG. 6 shows another embodiment 600 of the present invention wherein asperities are found at well-defined locations 620 on the recording medium, in this case shown as a disk 602. The disk is rotated in the direction 604 by a motor to which it is rotatably connected through a spindle, so that it spins when given a signal from the disk controller, not shown. Upon spinning, the slider 606 with the head 614 disposed thereon is loaded onto the disk 602 by the motion of an actuator to which the slider 606 is attached through a suspension 608 attached thereto. The actuator motion in loading the slider 606 onto the disk 602 is also controlled through a signal received from the disk controller. In the case of a rough zone of the disk, at least one asperity is located along the recording track 610. When a drive is determined to have asperities found at well-defined locations 620, these asperities 620 can be used as "sources of stress" for in-situ stress testing of the head 614. The head can be controllably positioned over the asperity, the asperity can be "gated out" electronically, and recording measurements can be made as a function of stress applied to the head by its interaction with the asperity through a head/disk interaction (HDI). It may then be determined if the drive is sufficiently robust for shipment.

Those skilled in the art will recognize that the present invention is not meant to be limited to using asymmetry as the sole indicator of changes in the read sensor due to stress. Indicators of changes in the read sensor may include sensor resistance, signal-to-noise ration (SNR), bit error rate (BER), overwrite (OW), stability of a free layer, stability of a hard bias field, pulse width at 50% of amplitude (PW50), and non-linear transition shift (NLTS). All these indicators are recording system performance parameters that are well-known to those skilled in the art, that can be affected by any changes occurring in the read sensor of the magnetic recording head, and are therefore equally performance parameters of a magnetic recording head. These tests do not require any additional special hardware or test equipment. In particular, BER is an extremely sensitive indicator of device performance. In addition, the head can be damaged in many ways during head-disk interactions (HDI's), e.g., free layer destabilization, hard bias field reduction, shield smearing/shorting. Additional tests can be used to distinguish between these assorted damage modes.

Figure 7:
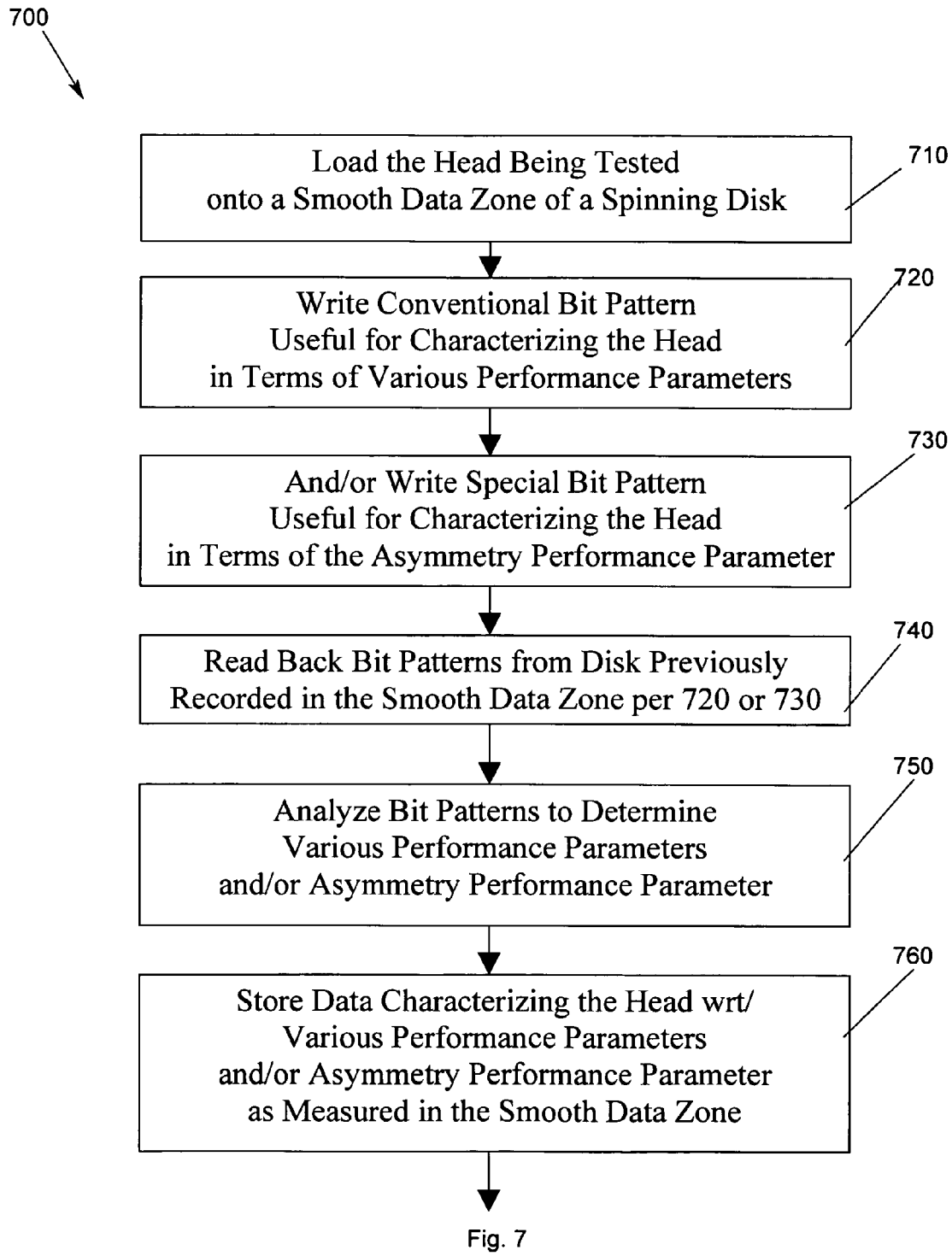
FIG. 7 is a flow chart showing the method of characterizing the performance of a head on a smooth data zone of the disk according to an embodiment of the present invention.

FIG. 7 is a flow chart 700 showing the method of characterizing the performance of a head on a smooth data zone of the disk (e.g., 410 of FIG. 4) according to an embodiment of the present invention. The head being tested is loaded onto a smooth data zone of a spinning disk 710. A bit pattern is written to the disk for providing an indication of various performance parameters and/or asymmetry performance. More specifically, a conventional bit pattern, which is useful for characterizing the head in terms of various performance parameters, is written 720. Without limitation, an example of a conventional bit pattern is an alternating sequence of "1's" and "0's", i.e. . . . 10101010 . . . . Alternatively, a special bit pattern, an example of which is shown in FIG. 11, useful for characterizing the head in terms of the asymmetry performance parameter is written 730. The bit patterns recorded in the smooth data zone per 720 or 730, 740 are read back from the disk. The bit patterns are analyzed to determine various performance parameters and/or the asymmetry performance parameter 750. Data characterizing the head write recovery table, various performance parameters and/or asymmetry performance parameter, as measured in the smooth data zone, are stored to a memory 760.

Figure 8:
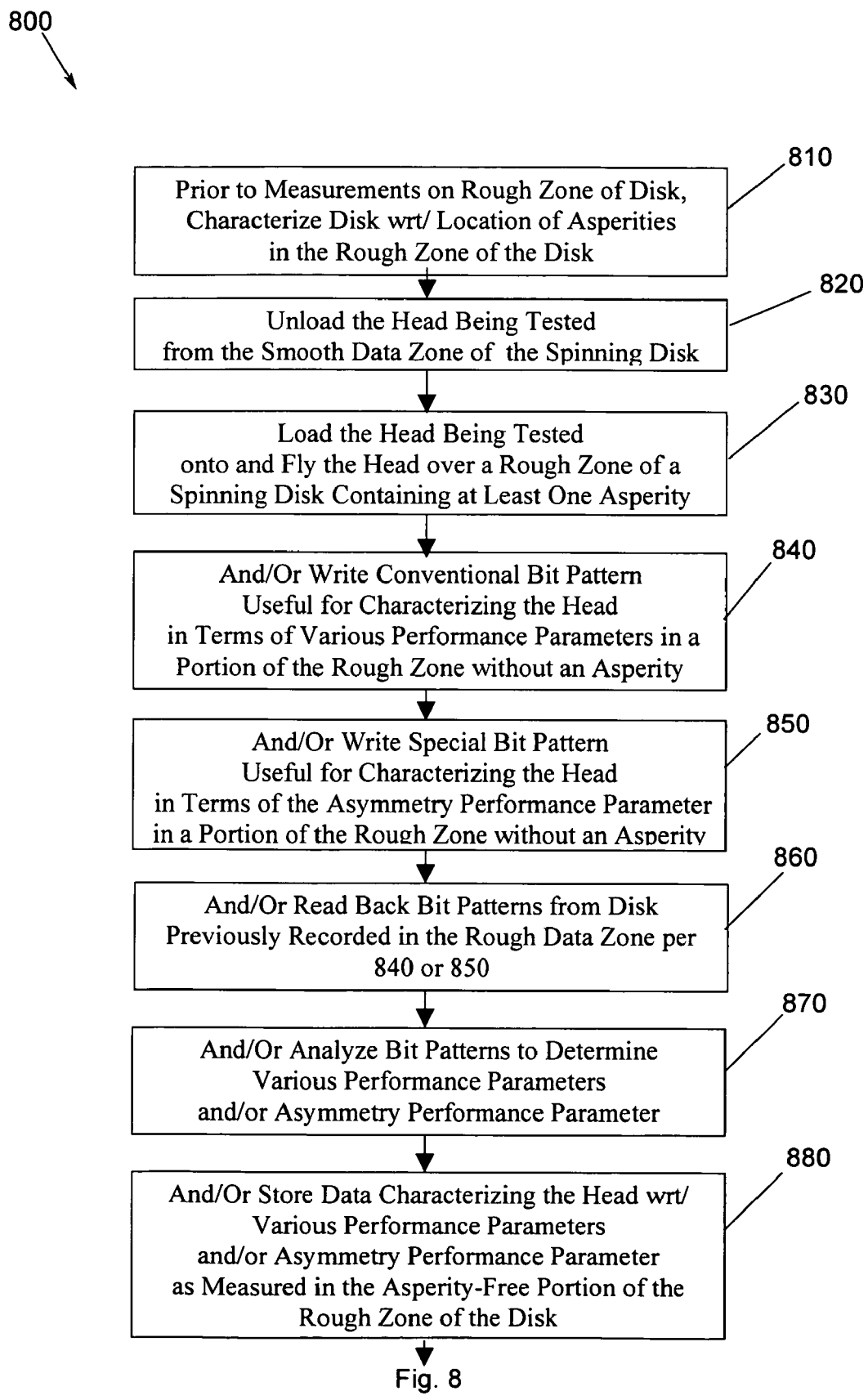
FIG. 8 is a flow chart showing the method of characterizing the performance of a head on a rough zone of the disk according to an embodiment of the present invention.

FIG. 8 is a flow chart 800 showing the method of stressing a head and/or characterizing the performance of a head on a rough zone of the disk (e.g., 420 of FIG. 4) according to an embodiment of the present invention. In FIG. 8, prior to measurement on rough zone of the disk, the disk is characterized with respect to the location of asperities in the rough zone 810. In particular, the disk write recovery table location of asperities in the rough zone of the disk is characterized. The head being tested is unloaded from the smooth data zone of the spinning disk 820. The head being tested is loaded onto and flown over the rough zone of the spinning disk containing at least one asperity 830. In this way, the head being tested can be stressed through an HDI with an asperity contained in the rough zone. Additionally, depending on the availability of portions of the rough zone free from asperities that are suitable for recording, the performance of the head can be characterized on such asperity-free portions of the rough zone as described by 840 through 880 below. And/or a conventional bit pattern useful for characterizing the head in terms of various performance parameters is written in a portion of the rough zone without an asperity 840. Alternatively, a special bit pattern useful for characterizing the head in terms of the asymmetry performance parameters may be written in a portion of the rough zone without an asperity 850. And/or the bit pattern recorded in the rough zone per 830 or 840, 850 is read back from the disk 860. And/or the bit pattern is analyzed to determine various performance parameters and/or asymmetry performance parameter 870. And/or data characterizing the head write recovery table, various performance parameters and/or asymmetry performance parameter as measured in the asperity-free portion of the rough zone of the disk are stored to a memory 880.

Figure 9:
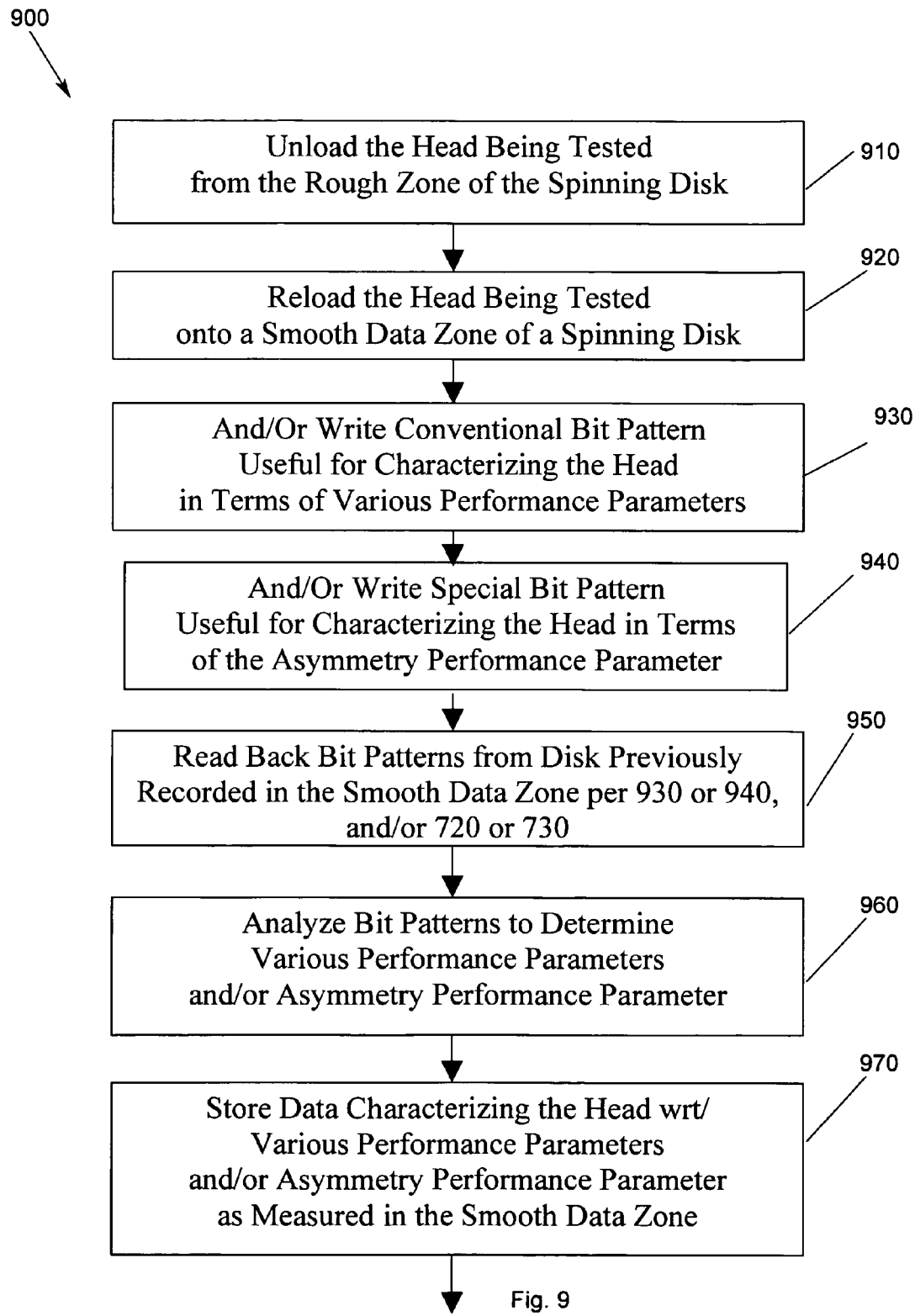
FIG. 9 is a flow chart showing the method of repeating the characterization of the performance of a head on a smooth zone of the disk according to an embodiment of the present invention.

FIG. 9 is a flow chart 900 showing the method of repeating the characterization of the performance of a head on a smooth zone of the disk after the head is stressed (e.g., 430 of FIG. 4) according to an embodiment of the present invention. In FIG. 9, the head being tested is unloaded from the rough zone of the spinning disk 910. The head being tested is reloaded onto the smooth data zone of the spinning disk 920. In addition, to reading back the original bit pattern recorded in the smooth zone per the flow chart 700, the smooth zone may be written a second time after the head is stressed as described by 930 and 940 below. And/or a conventional bit pattern useful for characterizing the head in terms of various performance parameters is written 930. Alternatively, a special bit pattern useful for characterizing the head in terms of the asymmetry performance parameters may be written 940. The bit pattern is read back from the disk recorded in the smooth data zone per 930 or 940, and/or 720 or 730 950. The bit pattern is analyzed to determine various performance parameters and/or asymmetry performance parameter 960. Data characterizing the head write recovery table, various performance parameters and/or asymmetry performance parameter as measured in the smooth data zone of the disk are stored to a memory 970.

Figure 10:
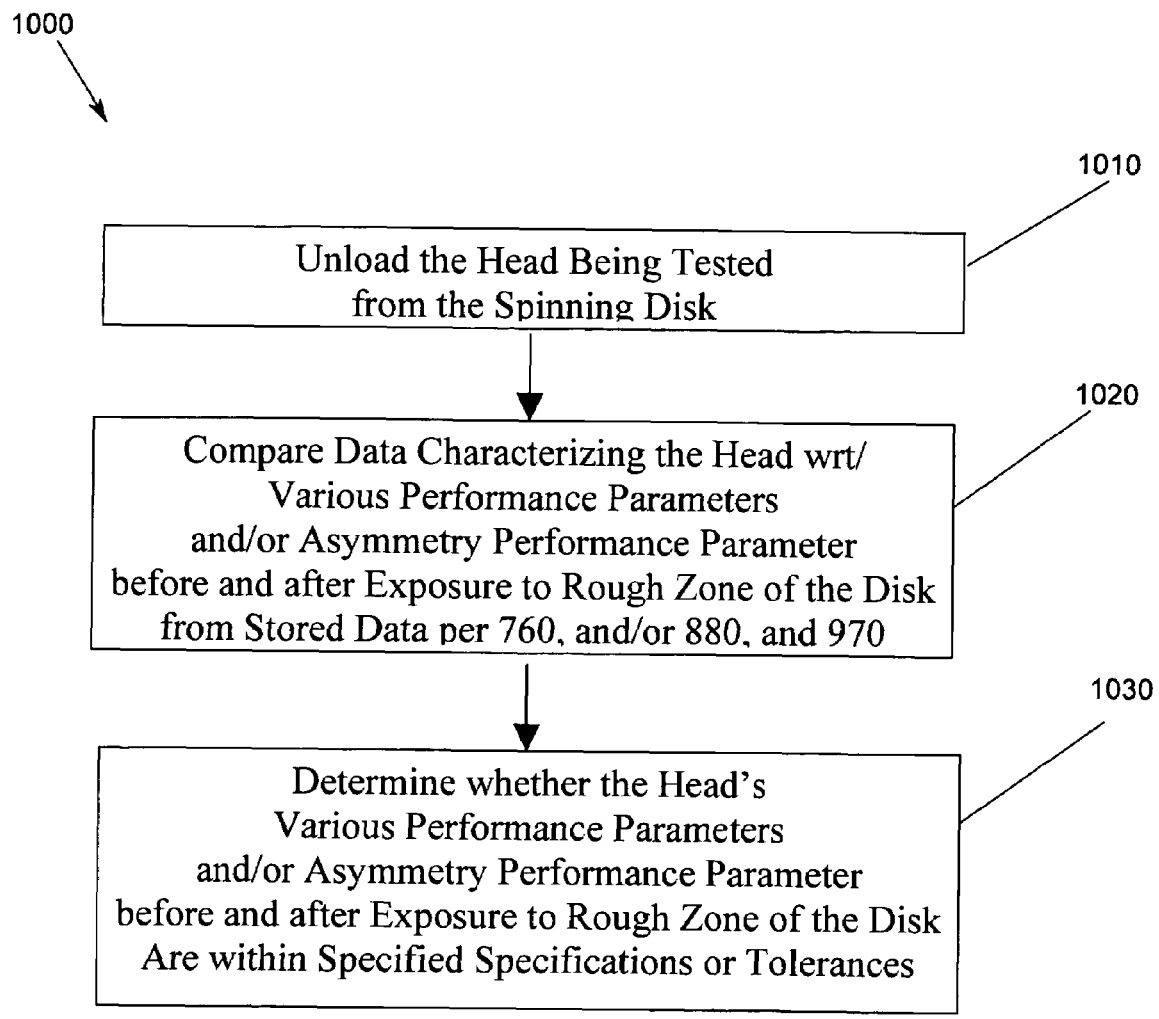
FIG. 10 is a flow chart showing the method of comparing performance characterization of the head on a rough zone of the disk and the performance of the head on a smooth data zone of the disk according to an embodiment of the present invention.

FIG. 10 is a flow chart 1000 showing the method of comparing performance characterization of the head after stressing the head on a rough zone of the disk and the performance of the head on a smooth data zone of the disk (e.g., 440 of FIG. 4) according to an embodiment of the present invention. In FIG. 10, the head being tested is unloaded form the spinning disk 1010. The data characterizing the head write recovery table, various performance parameters and/or asymmetry performance parameter before and after exposure to the rough zone of the disk are compared based on data stored per 760, and/or 880, and 970 1020. A determination is made whether the head's various performance parameters and/or asymmetry performance parameter before and after exposure to the rough zone of the disk are within specifications or tolerances 1030.

FIG. 11 illustrates a simple test pattern 1100 according to an embodiment of the present invention. FIG. 11 shows a test pattern 1100 of 1000 . . . 0000111000 . . . 0000, where each "1" of the pattern is a transition recorded to the medium. The first "1" 1110 in the pattern results in a relatively isolated read-back pulse. On the other hand, the "111" or "tribit" transitions 1120 are written relatively close to each other. Due to the interactions among the tribit transitions 1120, the net amplitude of the tribit cluster 1120 is relatively small. As a result, the amplitude asymmetry as measured with this special pattern is relatively high and has a well-defined sign. The test pattern 1100 shown in FIG. 11 may be repeated in a revolution; thus, the test pattern 1100 includes at least one pattern per revolution and may include multiple test patterns per revolution.

Figure 12:
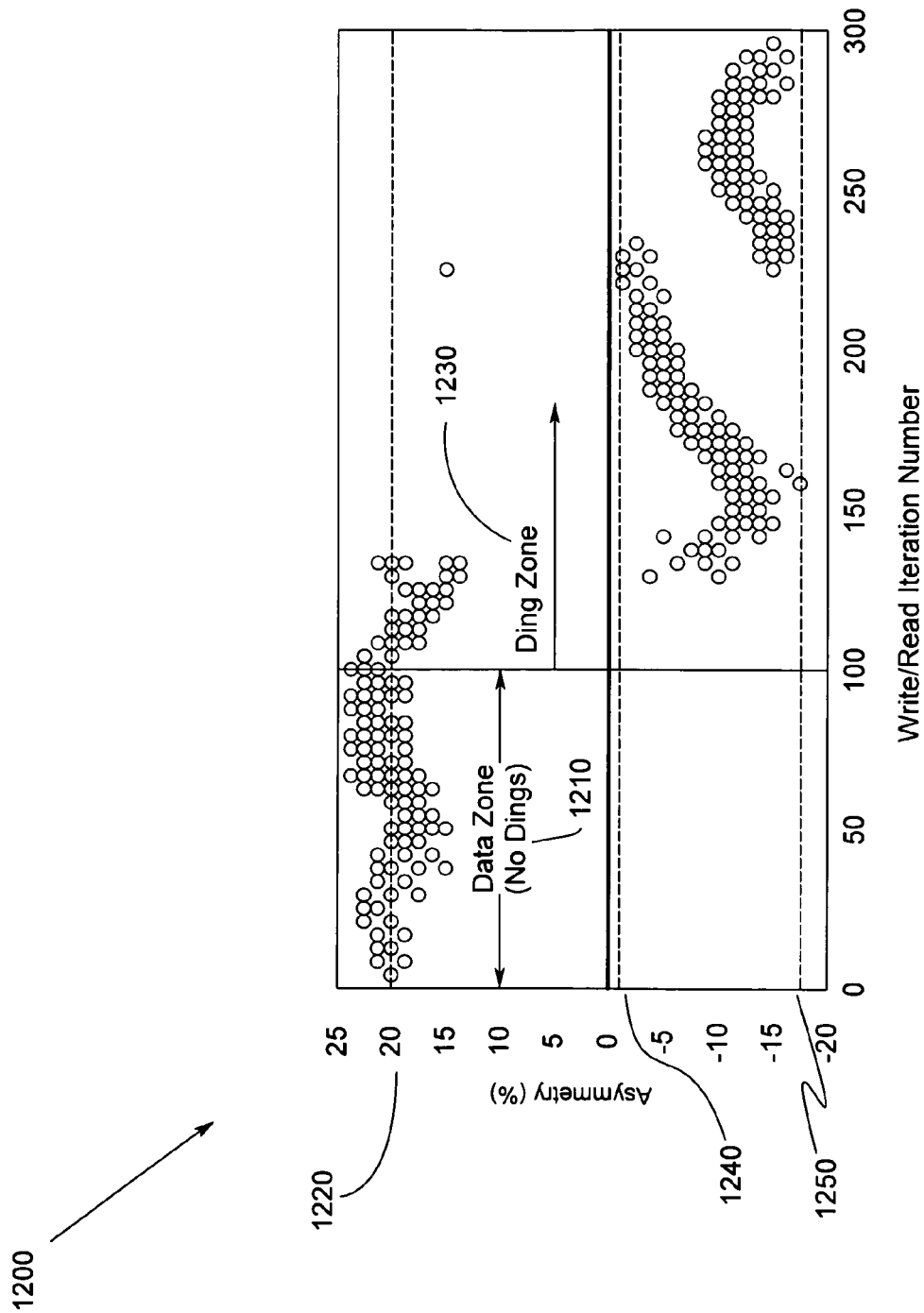
FIG. 12 is a graph showing the measurement of asymmetry versus the write/read iteration number according to an embodiment of the present invention.

FIG. 12 is a graph showing the measurement of asymmetry versus the write/read iteration number according to an embodiment of the present invention. Asymmetry is defined in terms of the positive, Vp, and negative, Vn, voltage shifts from the quiescent voltage level across a magnetoresistive or giant magnetoresistive read sensor element; the asymmetry is given by (Vp−Vn)/(Vp+Vn), and is usually expressed as the percentage equivalent of the decimal value of this ratio. FIG. 12 shows data first being measured using the special pattern in the data zone 1210, yielding an average value of about 20% 1220. For example, the pattern may be read 100 times in the data zone. Then, the sensor enters a "ding" zone, e.g. a rough zone, 1230 containing asperities, and the asymmetry is measured as the head traversed the ding zone. For example, the pattern may be read 200 times in the "ding" zone. In this particular example, the asymmetry changes sign due to damage after about 30 measurements in the ding zone. The measurements of asymmetry in the "ding" zone vary from about −1% 1240 to about −18% 1250. This change in asymmetry clearly indicates a change in the performance of the read sensor.

Confirmation may be provided using a final measurement in the smooth data zone to show that the sensor has indeed undergone severe damage, as indicated by the change in the sign of the asymmetry in FIG. 12. The data shown in FIG. 12 may be recorded automatically during head testing.

Figure 13:
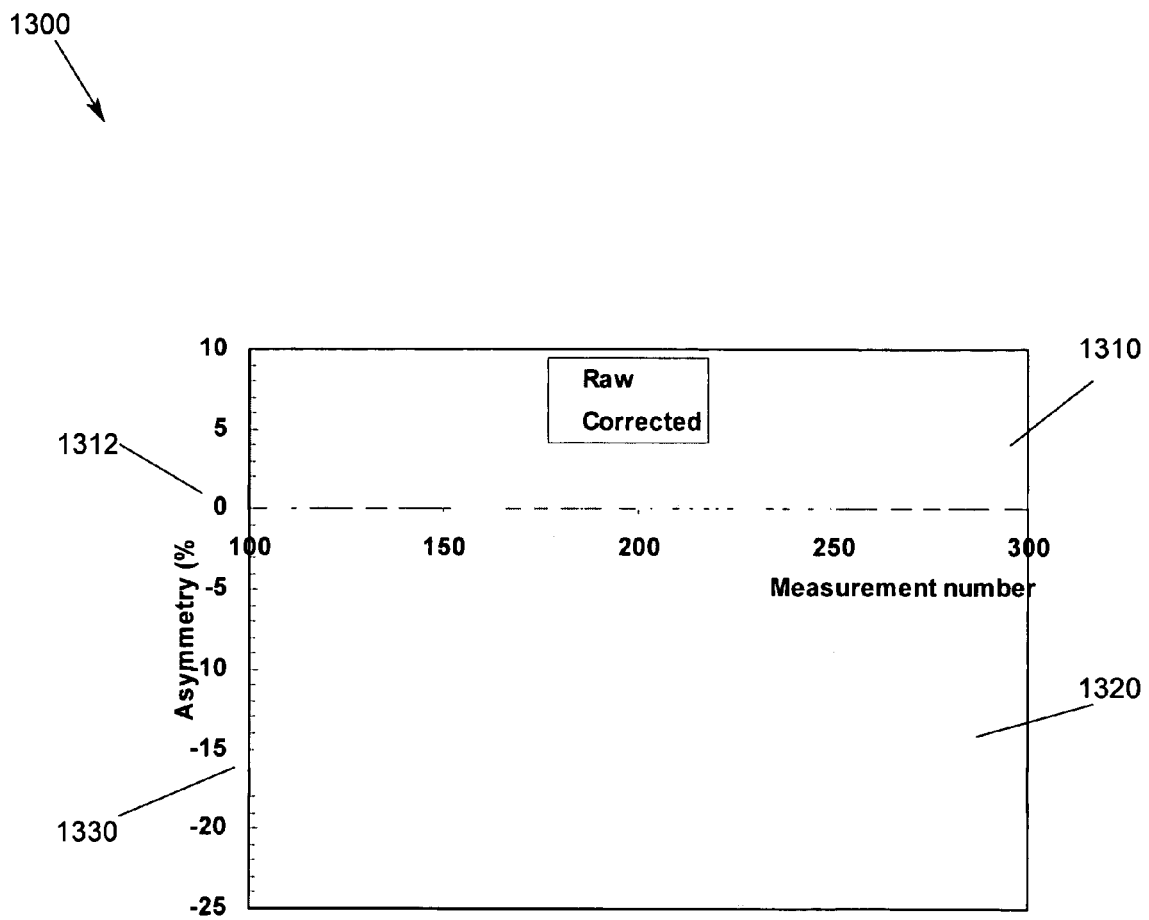
FIG. 13 is a graph showing calibration of a head to remove intrinsic asymmetry from special pattern asymmetry according to an embodiment of the present invention.

FIG. 13 is a graph 1300 showing calibration of a head to remove the intrinsic asymmetry of the read sensor element from asymmetry measured using the special bit pattern of FIG. 11 according to an embodiment of the present invention. The "special bit pattern" is highly asymmetric as written and read back from the disk. On the other hand, if the read sensor has an "intrinsic asymmetry" when reading back a simple, symmetric pattern, such as a conventional . . . 01010101 . . . bit pattern, then the special bit pattern asymmetry may cancel the intrinsic asymmetry, i.e., the special bit pattern asymmetry and the "intrinsic asymmetry" may be opposite and approximately equal thereby yielding a relatively low net asymmetry. When the net asymmetry is near zero, it is difficult to detect changes in the asymmetry due to stress. One way to circumvent this very practical issue is to first measure the intrinsic reader asymmetry in the smooth data zone using a simple, symmetric pattern. Then, the intrinsic asymmetry is subtracted from the special bit pattern asymmetry, which will provide the measurement of asymmetry using the special bit pattern with more sensitivity.

In FIG. 13, data showing the net asymmetry is close to zero. In this example, the special bit pattern asymmetry is assumed to be about +17% while the intrinsic reader asymmetry was about −17% 1330 thereby giving a net asymmetry 1310 of approximately zero 1312. In this state, if the pinned layer flips due to stress, a +0.5% asymmetry will change to about −0.5% asymmetry. Thus, it will be very difficult to detect such small relative changes. However, if the intrinsic reader asymmetry 1320 of about −17% 1330 is subtracted, a −17% asymmetry will switch to about +17% when the pinned layer flips due to stress. Accordingly, the change is much easier to detect. As discussed above, the intrinsic asymmetry may be measured on a simple, symmetric pattern consisting of relatively isolated pulses.

Figure 14:
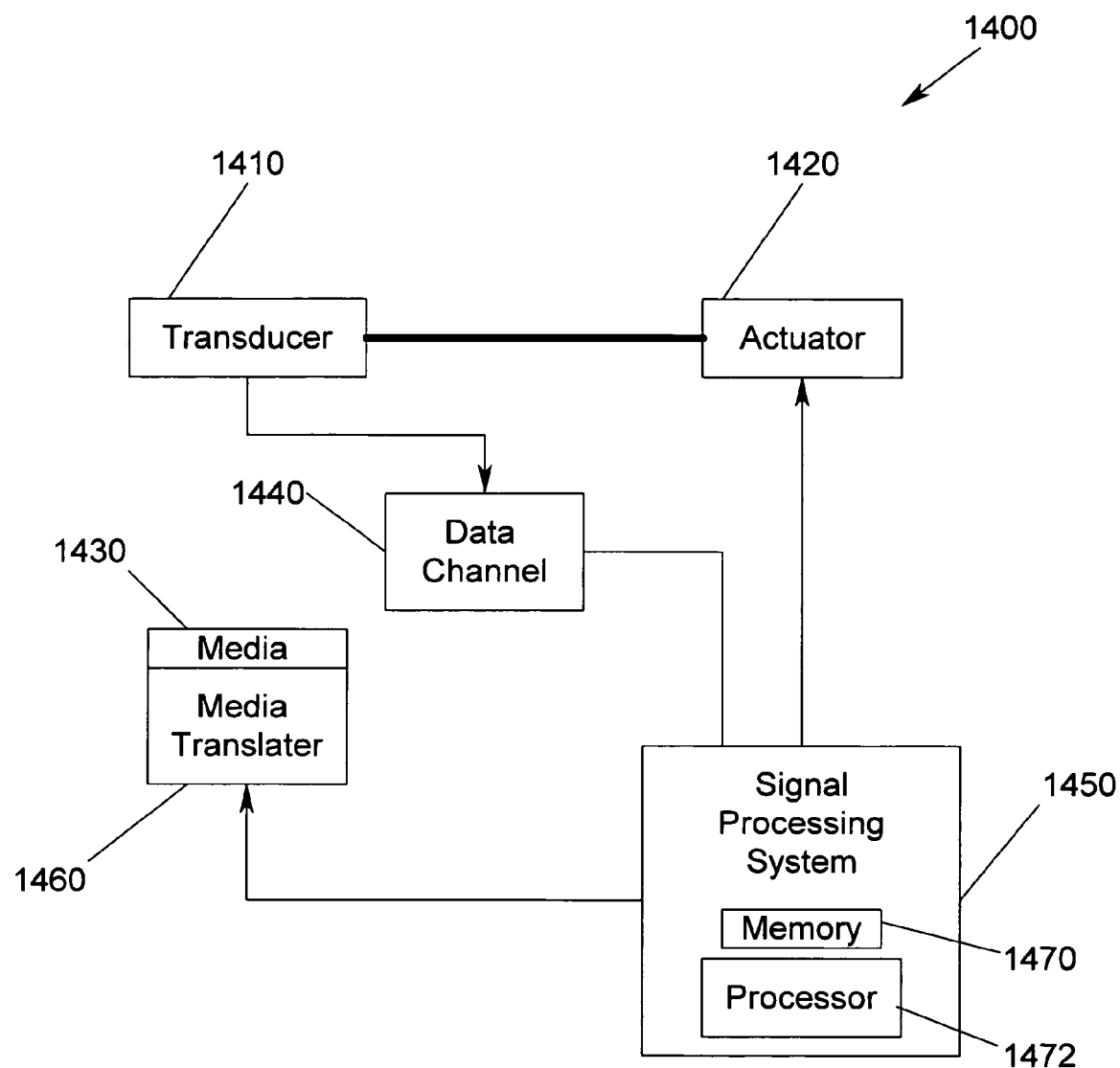
FIG. 14 illustrates a storage system according to an embodiment of the present invention.

FIG. 14 illustrates a system for characterizing a change in a performance parameter of a head 1400 according to an embodiment of the present invention. In FIG. 14, a transducer, i.e. a head, 1410 is under control of an actuator 1420. The actuator 1420 controls the position of the transducer 1410. The transducer 1410 writes data to and reads data from a magnetic medium, e.g. a magnetic recording disk, 1430. The read/write signals are passed to a data channel 1440. A signal processor system 1450 controls the actuator 1420 and processes the signals of the data channel 1440. In addition, a medium translator, e.g. a motor, 1460 is controlled by the signal processor system 1450 to cause the magnetic medium 1430 to move relative to the transducer, e.g. by rotation of the disk, 1410. A bit pattern characterizing a performance parameter of the transducer is analyzed by the processor 1472. The resulting data on the performance parameter is stored to a memory 1470 from where the performance parameter may be recalled for comparison with other such data, and output from the signal processing system to an output device connected thereto (not shown) for comparison in characterization of the head. Moreover, the processor is equipped with an analyzer which without limitation might comprise an analog to digital converter (ADC) for performing calculations on read-back signals to provide a value of a performance parameter stored to the memory 1470 as data, and a calculator which without limitation might comprise an arithmetic logic unit (ALU) to provide values of derived performance parameters, such as corrected performance parameters, based on calculations or arithmetic operations performed on values of performance parameters input to the calculator, or ALU from the memory 1470 or even directly from the analyzer. Nevertheless, the present invention is not meant to be limited to a particular type of system 1400 or to the type of medium 1430 used in the system 1400. Without limitation, such a system for characterizing a change in a performance parameter of a head 1400 might comprise a test stand, spin stand, or even a hard disk drive (HDD).

Figure 15:
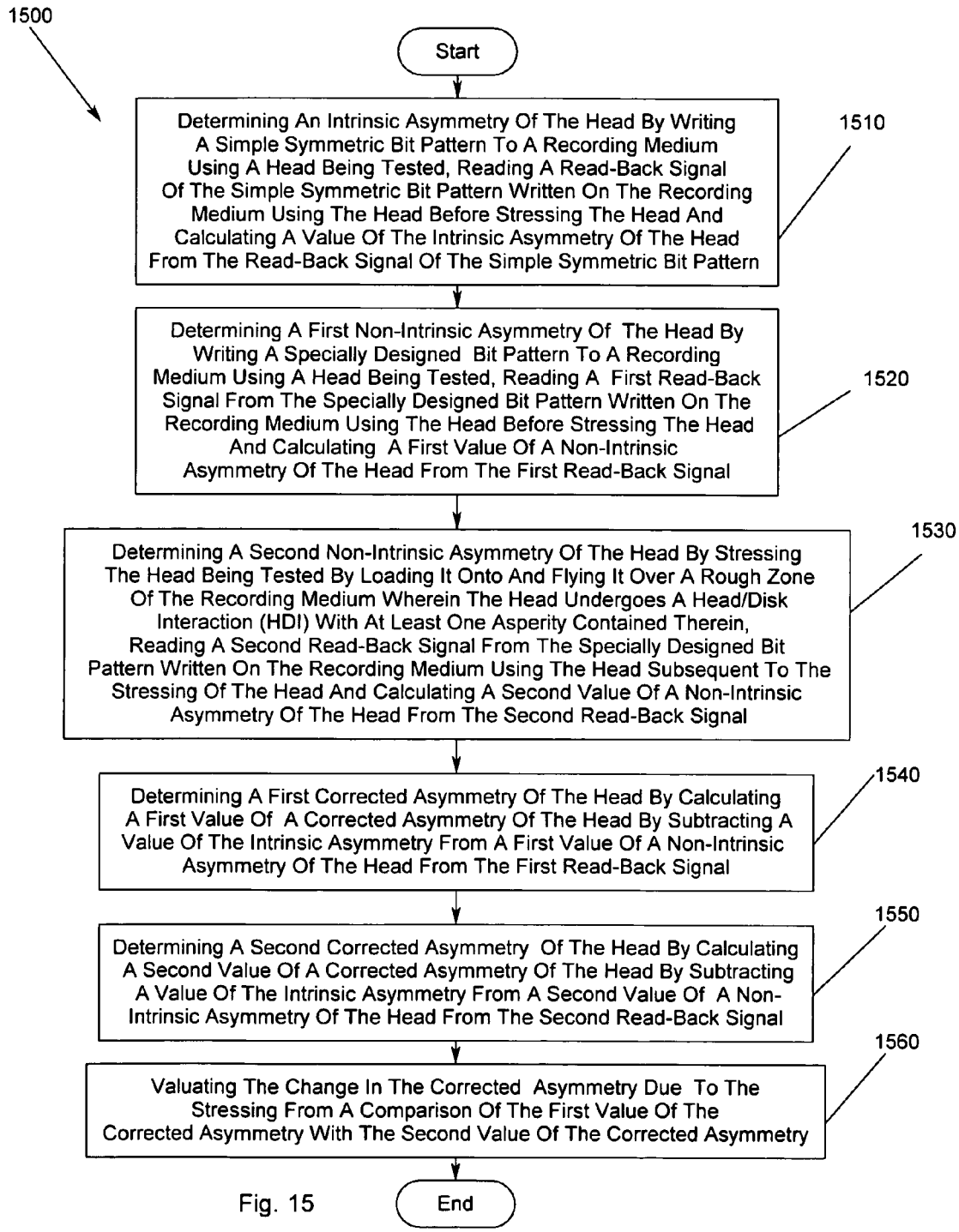
FIG. 15 is a flow chart showing a method for determining intrinsic, non-intrinsic and corrected asymmetry of a head according to an embodiment of the present invention.

FIG. 15 is a flow chart 1500 showing a method for determining intrinsic, non-intrinsic and corrected asymmetry of a head according to an embodiment of the present invention. An intrinsic asymmetry of the head is determined by writing a simple symmetric bit pattern to a recording medium using a head being tested by reading a read-back signal of the simple symmetric bit pattern written on the recording medium using the head before stressing the head, and by calculating a value of the intrinsic asymmetry of the head from the read-back signal of the simple symmetric bit pattern 1510. A first non-intrinsic asymmetry of the head is determined by writing a specially designed bit pattern to a recording medium using a head being tested, by reading a first read-back signal from the specially designed bit pattern written on the recording medium using the head before stressing the head, and by calculating a first value of a non-intrinsic asymmetry of the head from the first read-back signal 1520. A second non-intrinsic asymmetry of the head is determined by stressing the head being tested by loading it onto and flying it over a rough zone of the recording medium wherein the head undergoes a head/disk interaction (HDI) with at least one asperity contained therein, by reading a second read-back signal from the specially designed bit pattern written on the recording medium using the head subsequent to the stressing of the head, and by calculating a second value of a non-intrinsic asymmetry of the head from the second read-back signal 1530. A first corrected asymmetry of the head is determined by calculating a first value of a corrected asymmetry of the head by subtracting a value of the intrinsic asymmetry from a first value of a non-intrinsic asymmetry of the head from the first read-back signal 1540. A second corrected asymmetry of the head is determined by calculating a second value of a corrected asymmetry of the head by subtracting a value of the intrinsic asymmetry from a second value of a non-intrinsic asymmetry of the head from the second read-back signal 1550. The change in the corrected asymmetry due to the stressing from a comparison of the first value of the corrected asymmetry with the second value of the corrected asymmetry is valuated 1560.

Figure 16:
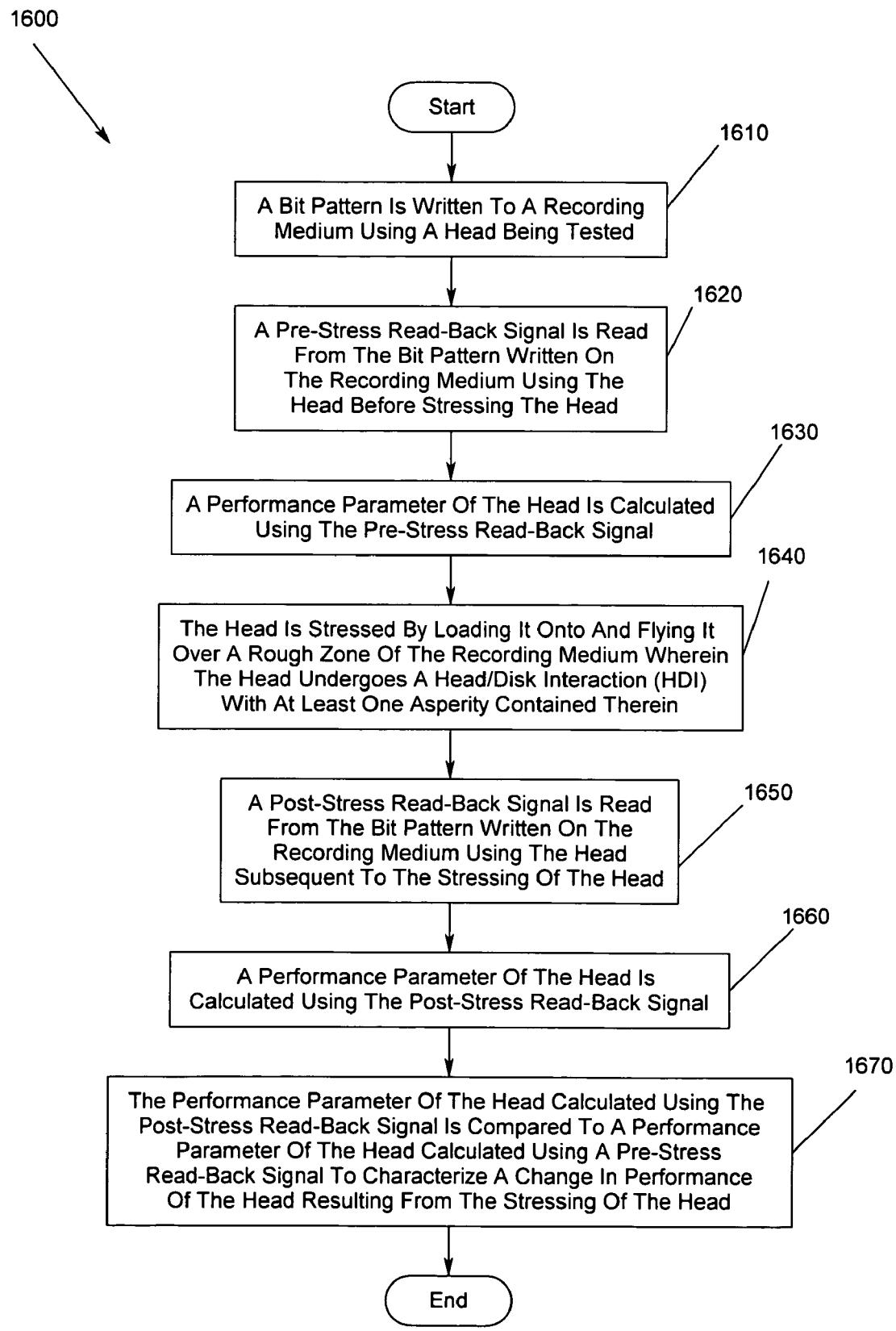
FIG. 16 is a flow chart showing a method for quantifying stress and damage in magnetic heads according to an embodiment of the present invention.

FIG. 16 is a flow chart 1600 showing a method for characterizing a change in a performance parameter of a head, and, in particular, for quantifying stress and damage in magnetic heads according to an embodiment of the present invention. A bit pattern is written to a recording medium using a head being tested 1610. A pre-stress read-back signal is read from the bit pattern written on the recording medium using the head before stressing the head 1620. A performance parameter of the head is calculated using the pre-stress read-back signal 1630. The head is stressed by loading it onto and flying it over a rough zone of the recording medium wherein the head undergoes a head/disk interaction (HDI) with at least one asperity contained therein 1640. A post-stress read-back signal is read from the bit pattern written on the recording medium using the head subsequent to the stressing of the head 1650. A performance parameter of the head is calculated using the post-stress read-back signal 1660. The performance parameter of the head calculated using the post-stress read-back signal is compared to a performance parameter of the head calculated using a pre-stress read-back signal to characterize a change in performance of the head resulting from the stressing of the head 1670.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for characterizing a change in a performance parameter of a magnetic recording head comprising:
   determining a value of intrinsic asymmetry of a head;
   determining a first value of non-intrinsic asymmetry of the head prior to stressing the head;
   determining a first corrected asymmetry of the head prior to stressing the head by subtracting the value of the intrinsic asymmetry from the first value of non-intrinsic asymmetry of the head;
   determining a second value of non-intrinsic asymmetry of the head subsequent to stressing the head;
   determining a second corrected asymmetry of the head subsequent to stressing the head by subtracting the value of the intrinsic asymmetry from the second value of non-intrinsic asymmetry of the head; and
   determining a change in corrected asymmetry of the head due to the stressing of the head by comparing the first corrected asymmetry to the second corrected asymmetry.

2. The method of claim 1, wherein the determining the value of intrinsic asymmetry of a head further comprises:
   writing a simple symmetric bit pattern to a recording medium using the head;
   reading a first read-back signal of the simple symmetric bit pattern written on the recording medium using the head; and
   calculating the value of the intrinsic asymmetry of the head from the reading of the first read-back signal of the simple symmetric bit pattern.

3. The method of claim 2, wherein the determining the first value of non-intrinsic asymmetry of the head further comprises:
   writing a specially designed bit pattern to a recording medium using the head;

reading a second read-back signal from the specially designed bit pattern written on the recording medium using the head; and calculating the first value of a non-intrinsic asymmetry of the head from the second read-back signal.

4. The method of claim 3, wherein the determining the second value of non-intrinsic asymmetry of the head further comprises:

stressing the head by loading it onto and flying it over a rough zone of the recording medium to cause the head to undergo a head/disk interaction (HDI) with at least one asperity in the rough zone;

reading a third read-back signal from the specially designed bit pattern written on the recording medium using the head subsequent to the stressing of the head; and calculating the second value of a non-intrinsic asymmetry of the head from the third read-back signal.

5. The method of claim 1, wherein the determining the first value of non-intrinsic asymmetry of the head further comprises:

writing a specially designed bit pattern to a recording medium using the head;

reading a second read-back signal from the specially designed bit pattern written on the recording medium using the head; and calculating the first value of a non-intrinsic asymmetry of the head from the second read-back signal.

6. The method of claim 1, wherein the determining the second value of non-intrinsic asymmetry of the head further comprises:

stressing the head by loading it onto and flying it over a rough zone of the recording medium to cause the head to undergo a head/disk interaction (HDI) with at least one asperity in the rough zone;

reading a third read-back signal from the specially designed bit pattern written on the recording medium using the head subsequent to the stressing of the head; and calculating the second value of a non-intrinsic asymmetry of the head from the third read-back signal.

7. A system for characterizing a change in a performance parameter of a magnetic recording head being tested, comprising:

a disk for magnetic recording having a smooth zone and a rough zone containing at least one asperity for stressing a head and rotatably connected with a motor;

a magnetic head for reading bit patterns from and writing bit patterns to the disk and having an air bearing surface;

a suspension to which the head is attached for flying the head over the disk on an air bearing;

an actuator for moving the suspension with the head attached thereto from one location to another on the disk in response to signals provided from a controller; and a processor, coupled to the head, for characterizing a disk by identifying locations of asperities in a rough zone of the disk to be engaged by the head, determining a value of intrinsic asymmetry of a head, determining a first value of non-intrinsic asymmetry of the head prior to stressing the head, determining a first corrected asymmetry of the head prior to stressing the head by subtracting the value of the intrinsic asymmetry from the first value of non-intrinsic asymmetry of the head, determining a second value of non-intrinsic asymmetry of the head subsequent to stressing the head, determining a second corrected asymmetry of the head subsequent to stressing the head by subtracting the value of the intrinsic asymmetry from the second value of non-intrinsic asymmetry of the head and determining a change in corrected asymmetry of the head due to the stressing of the head by comparing the first corrected asymmetry to the second corrected asymmetry.

8. The system of claim 7, wherein the processor determines the value of intrinsic asymmetry of a head by writing a simple symmetric bit pattern to a recording medium using the head, reading a first read-back signal of the simple symmetric bit pattern written on the recording medium using the head and calculating the value of the intrinsic asymmetry of the head from the reading of the first read-back signal of the simple symmetric bit pattern.

9. The system of claim 8, wherein the processor determines the first value of non-intrinsic asymmetry of the head by writing a specially designed bit pattern to a recording medium using the head, reading a second read-back signal from the specially designed bit pattern written on the recording medium using the head and calculating the first value of a non-intrinsic asymmetry of the head from the second read-back signal.

10. The system of claim 9, wherein the processor determines the second value of non-intrinsic asymmetry of the head by stressing the head by loading it onto and flying it over a rough zone of the recording medium to cause the head to undergo a head/disk interaction (HDI) with at least one asperity in the rough zone, reading a third read-back signal from the specially designed bit pattern written on the recording medium using the head subsequent to the stressing of the head and calculating the second value of a non-intrinsic asymmetry of the head from the third read-back signal.

11. The system of claim 7, wherein the processor determines the first value of non-intrinsic asymmetry of the head by writing a specially designed bit pattern to a recording medium using the head, reading a second read-back signal from the specially designed bit pattern written on the recording medium using the head and calculating the first value of a non-intrinsic asymmetry of the head from the second read-back signal.

12. The system of claim 7, wherein the processor determines the second value of non-intrinsic asymmetry of the head by stressing the head by loading it onto and flying it over a rough zone of the recording medium to cause the head to undergo a head/disk interaction (HDI) with at least one asperity in the rough zone, reading a third read-back signal from the specially designed bit pattern written on the recording medium using the head subsequent to the stressing of the head and calculating the second value of a non-intrinsic asymmetry of the head from the third read-back signal.

* * * * *